Patented Feb. 25, 1936

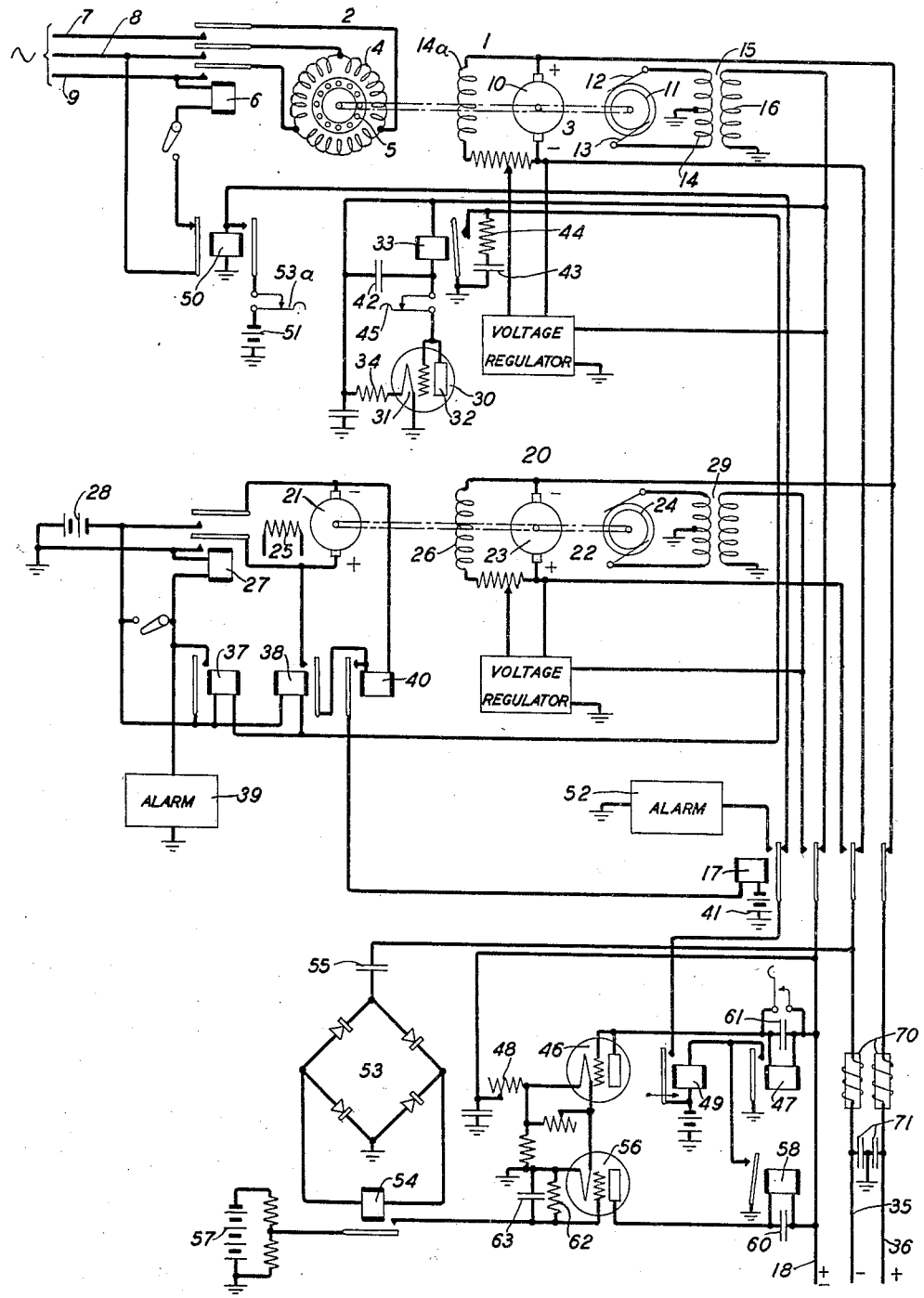

2,031,942

UNITED STATES PATENT OFFICE 2,031,942

CONTROL CIRCUIT

James M. Duguid, Springfield, N. J., and John H. Sole, Brooklyn, N. Y., assignors to Bell Telephone Laboratories, Incorporated, New York, N. Y., a corporation of New York Application November 1, 1934, Serial No. 750,918

13 Claims. (Cl. 179—84)

This invention relates to control circuits for sources of power and particularly to control circuits for sources of power supplied to coin control circuits and ringing circuits in a telephone system.

One object of the invention is to provide a control circuit with two motor generator sets and a transfer relay for connecting either of the motor generator sets to a load circuit that shall start the other motor generator set when the load circuit is connected to one motor generator set and the load circuit voltage falls below a predetermined lower limit and that shall transfer the load circuit to the second motor generator set when the speed of the second set is raised to normal value.

Another object of the invention is to provide a control circuit that shall stop the operation of a generator supplying power to a load circuit when the load circuit voltage is raised above a predetermined value and that shall transfer the load circuit to another source of power.

A further object of the invention is to provide a control circuit with two motor generator sets having double current generators that shall stop the operation of one of the motor generator sets when the load circuits are connected thereto and one of the slip ring brushes fails or the generator voltage rises above a predetermined upper limit and that shall transfer the load circuits to the other motor generator set.

In a telephone system, 20 cycle alternating current is employed for ringing purposes and direct current is employed for coin control purposes. It is essential that a source of direct current be available at all times for coin control purposes and that a source of alternating current be available at all times for ringing purposes. It is customary to provide a main motor generator set having an alternating current motor connected to a commercial source of alternating current and a generator provided with a commutator and slip rings connected to coin control and ringing circuits. A second auxiliary motor generator set having a direct current motor which may be connected to a storage battery and a double current generator is provided for use in case of failure of the main motor generator set operated from the source of alternating current. In motor generator sets of the above indicated type the generator fields are supplied with voltage from the commutators.

In accordance with the present invention control circuits are provided for starting the auxiliary motor generator set operated from a storage battery when the voltage of the generator on the main motor generator set falls below a predetermined lower limit and for transferring the load circuits from the main motor generator set to the auxiliary motor generator set when the auxiliary motor generator set is operated at normal speed. The control circuits also serve to stop the main motor generator set in case voltages above a predetermined upper limit is supplied to the load circuits or in case of failure of one of the slip ring brushes on the generator of the main motor generator set. The control circuits further start the operation of the auxiliary motor generator set and transfer the load circuits from the main motor generator set to the auxiliary motor generator set upon operation of the auxiliary motor generator set at normal speed whenever the main motor generator set is stopped by reason of slip ring brush trouble or by reason of the generator of the main motor generator set supplying a voltage above a predetermined upper limit.

The main motor generator set comprises a double current generator and an alternating current motor which is connected to a commercial alternating current source by means of a suitable switch. An auxiliary motor generator set is provided comprising a double current generator and a direct current motor adapted to be connected to a storage battery. A transfer switch is provided for connecting the slip rings and the commutator of the generator of either motor generator set to coin control circuits and ringing circuits. A low voltage relay which is controlled by a two-element space discharge device according to the voltage developed by the generator of the main motor generator set is provided for starting the auxiliary motor generator set in case the voltage of the main generator falls below a predetermined value. The low voltage relay also controls the operation of the transfer switch to transfer the coin control circuits and the ringing circuits from the main motor generator set to the auxiliary motor generator set when the auxiliary motor generator set is operated at normal speed. An alarm is sounded when the low voltage relay is released to start the auxiliary motor generator set in order to inform the operator that the auxiliary motor generator set is in operation. If the main motor generator set returns to normal operation after the auxiliary motor generator set has been put in service, the low voltage relay is operated to stop the operation of the auxiliary motor generator set, to release the transfer relay and to transfer the coin control circuits and the ringing circuits from the auxiliary motor generator set to the main motor generator set. If the space discharge device controlling the low voltage relay fails for any reason as, for instance, failure of the filament, the low voltage relay is released to start the auxiliary motor generator set and transfer the coin control circuit and the ringing circuits from the main motor generator set to the auxiliary motor generator set.

If the coin control circuits and the ringing circuits are connected to the main motor generator set and voltage above a predetermined upper limit is supplied to the ringing circuits, a two-element space discharge device is operated for effecting operation of a high voltage relay. The high voltage relay completes a circuit for energizing a slow operating relay. The slow operating relay completes a circuit for disconnecting the motor of the main motor generator set from the alternating current source of supply to stop the main motor generator set. When stopping the main motor generator set, the reduction of the voltage developed by the generator of the main motor generator set releases the low voltage relay to start the auxiliary motor generator set and to transfer the coin control circuits and the ringing circuits from the main motor generator set to the auxiliary motor generator set. If high voltage is supplied to the ringing circuits when the coin control circuits and the ringing circuits are connected to the auxiliary motor generator set, then the high voltage space discharge device operates the high voltage relay and the slow operating relay to effect operation of an alarm.

When maintenance work is being done on the main motor generator set a slip ring brush may be left out or a slip ring brush may become inoperative. In this case it is desirable to have the coin control circuits and the ringing circuits transferred from the main motor generator set to the auxiliary motor generator set because of the abnormally high voltage which may be supplied to the coin control circuits. The slip rings of the generator are connected to the primary winding of a transformer. A central tap from the primary winding of the transformer is connected to ground. The positive and negative commutator brushes are connected to the coin control circuit through a filter which offers a fairly low impedance alternating current path to ground. This path permits alternating current to flow through half the primary winding of the transformer in case there is failure of one of the slip ring brushes. The motor generator set is provided with a voltage regulator controlled from the ringing circuits as disclosed in the patent to J. H. Sole, No. 1,998,104, dated April 16, 1935. The voltage regulator will tend to maintain the voltage on the ringing circuits substantially constant and in so doing would raise the voltage on the coin control circuits above normal value. A two-way rectifier is connected from the negative brush of the commutator to ground for rectifying the alternating current ripple in the current supplied by the commutator. The current rectified by this rectifier controls the operation of a relay which governs the negative bias on a three-element space discharge device. In case of failure of one of the slip ring brushes the alternating ripple voltage from the commutator is raised to effect operation of the relay controlled by the rectifier. The relay impresses negative potential on the grid of the three-element space discharge device to lower the current flow through the space discharge device and effect release of an auxiliary control relay. The auxiliary control relay completes a circuit for operating the above mentioned slow operating relay which completes a circuit for stopping the operation of the main motor generator set. When stopping the main motor generator set the voltage of the main generator is reduced to release the low voltage relay. The low voltage relay, in turn, starts the operation of the auxiliary motor generator set and controls the transfer of the coin control circuits and the ringing circuits from the main motor generator set to the auxiliary motor generator set.

The single figure in the accompanying drawing is a diagrammatic view of control circuits constructed in accordance with the invention.

Referring in the drawing, a main motor generator set 1 is provided with an alternating current motor 2 and a double current generator 3. The motor 2 is provided with a stator 4 and a rotor 5. The stator 4 is connected by a contactor 6 to an alternating current supply circuit comprising conductors 7, 8 and 9. The motor 2, if so desired, may be any other suitable type of alternating current motor. The generator 3 is provided with a commutator 10, slip rings 11 having brushes 12 and 13 and a field winding 14a. The field winding 14a is preferably connected to the commutator 10 and is controlled by a voltage regulator of the type disclosed in the patent to J. H. Sole, No. 1,860,556 dated May 31, 1932. The slip ring brushes 12 and 13 are connected to a primary winding 14 of a transformer 15. The secondary winding 16 of the transformer is connected by a transfer switch 17 to a ringing circuit 18. It is to be understood that any number of ringing circuits may be connected to the transformer 15.

An auxiliary motor generator set 20 is provided for operation in case of failure of the main motor generator set 1. The auxiliary motor generator set 20 comprises a direct current motor 21 and a generator 22 having a commutator 23 and slip rings 24. A field winding 25 is provided for the motor and a field winding 26 is provided for the generator. The field winding 25 may be energized from any suitable source of direct current. The field winding 26 is preferably connected to the commutator 23 and is controlled by a voltage regulator of the type disclosed in the patent to J. H. Sole, No. 1,860,556 dated May 31, 1932. The direct current motor 21 is connected by a contactor 27 to a source of direct current which is preferably a storage battery 28. The slip rings 24 of the generator 22 are connected to the primary winding of a transformer 29. The transformer 29 serves to connect the slip rings through the transfer switch 17 to the ringing circuit 18. A central tap from the primary winding of the transformer 29 is grounded.

A low voltage space discharge device 30 comprising a filament 31 and an anode 32 is provided for controlling the operation of a normally operated low voltage relay 33. The filament 31 of the space discharge device 30 has one terminal thereof grounded and the other terminal thereof connected through a resistance element 34 to one terminal of the secondary winding 16 of the transformer 15. The filament 31 is thus heated in accordance with voltage developed by the generator 3 of the main motor generator set. If the voltage of the generator 3 is reduced, the current flow through the space discharge device 30 is reduced. The operating coil for the low voltage relay 33 is connected in the plate circuit of the space discharge device 30 in order to be controlled in accordance with the space current flow through the device 30.

Assuming the transfer switch 17 to be in the position shown in the drawing, the ringing circuit 18 and the coin control circuits 35 and 36 to be connected to the main motor generator set and the voltage of the generator 3 to be reduced below a predetermined value, then the current flow through the space discharge device 30 is reduced and the relay 33 is released. The release of the low voltage relay 33 completes a circuit from ground for operating two relays 37 and 38. The relay 37 completes a circuit from the battery 28 for operating an alarm 39 and completes another circuit from the battery 28 for operating the contactor 27 to effect operation of the auxiliary motor generator set 20. The relay 38 connects the winding of a relay 40 across the armature of the motor 21. The relay 40 is thus controlled in accordance with the counter electromotive force of the motor 21 and in accordance with the speed of the auxiliary motor generator set. When the auxiliary motor generator set is operated at normal speed, the relay 40 operates for completing an energizing circuit from a battery 41 to operate the transfer switch 17. The transfer switch 17, when operated, transfers the ringing circuit 18 and the coin control circuits 35 and 36 from the main motor generator set 1 to the auxiliary motor generator set 20.

If the main motor generator set returns to normal operation after the transfer switch 17 has been operated and the coin control circuits and the ringing circuits have been transferred to the auxiliary motor generator set, then the heating of the filament 31 of the space discharge 30 is increased to increase the space current flow through the device and effect operation of the low voltage relay 33. Operation of the low voltage relay 33 breaks the operating circuits for the relays 37 and 38. The relay 37, upon releasing, opens the circuit for the operating coil of the contactor 27 to disconnect the motor 21 from the storage battery 28 and stop operation of the auxiliary motor generator set. The relay 38 when released opens the operating circuit for the transfer relay 17 to effect release of the transfer relay 17. The armature of the relay 40 is connected to the armature of the relay 38 in order to obtain a prompt release of the transfer switch 17 upon operation of the low voltage relay 33. The release of the transfer relay 17 transfers the coin control circuit and the ringing circuit from the auxiliary motor generator set to the main motor generator set. A condenser 42 is connected across the operating coil for the relay 33 to smooth out ripples in the rectified current from the space discharge device 30. The space discharge device 30 not only serves as a rectifier, but also as an amplifier. The contacts of the low voltage relay 33 are protected by the condenser 43 and resistance element 44. A switch 45 is provided for manually controlling the operation of the low voltage relay 33.

Assuming the transfer switch 17 to be in the position shown in the drawing and voltage above a predetermined limit to be supplied by the generator 3 to the ringing circuit 18, then the filament of a high voltage space discharge device 46 is heated above normal to increase the space current flow through the device. A high voltage relay 47 is connected in the plate circuit of the space discharge device 46 in order to be operated in accordance with the heating of the filament of the space discharge device. The increased current flow through the space discharge device effects operation of the high voltage relay 47. The high voltage relay 47 completes a circuit for operating a slow operating relay 49. The relay 49 when operated completes a circuit for operating a relay 50. The relay 50 completes a holding circuit for itself from a battery 51 and breaks the operating circuit for the contactor 6 to stop the operation of the main motor generator set 1. The stopping of the main motor generator set 1 will, of course, reduce the voltage supplied by the generator 3 and effect release of the low voltage relay 33. The release of the low voltage relay 33 starts the operation of the auxiliary motor generator set 20 in the manner above set forth and finally effects transfer of the load circuits comprising the ringing circuit and the coin control circuit from the main motor generator set to the auxiliary motor generator set.

In case high voltage is supplied to the ringing circuit 18 when the auxiliary motor generator set is in operation, then the high voltage space discharge device 46 operates the high voltage relay 47 which in turn operates the slow operating relay 49. The relay 49 completes a circuit for operating an alarm 52. When repairs have been made on the main motor generator set and it is desired to transfer the load circuits from the auxiliary motor generator set to the main motor generator set, it is necessary to operate a switch 53a for breaking the holding circuit of the relay 50. The release of the relay 50 permits operation of the contactor 6 to connect the motor 5 to the supply conductors 7, 8 and 9. When the voltage produced by the generator 3 of the main motor generator set is raised to normal value, the low voltage relay 33 is operated to stop the operation of the auxiliary motor generator set and release the transfer relay 17 to transfer the load circuits from the auxiliary motor generator set to the main motor generator set. The relay 49 is made slow to operate in order to allow the transfer of the load circuits from one motor generator set to another without operating an alarm.

A full wave rectifier 53 preferably comprising copper oxide elements arranged in the form of a bridge as shown in the drawing is provided for controlling the operation of a relay 54 according to the alternating current ripple on the direct current coin control circuit. A filter comprising inductance elements 70 and condensers 71 is provided in the coin control circuit to choke alternating current and to block alternating current for the rectifier 53. One vertex of the rectifier bridge circuit is grounded and an opposite vertex of the bridge is connected through a condenser 55 to the coin control conductor 35. The condenser 55 serves as a blocking condenser and controls the amount of current supplied the rectifier 53. The bridge circuit so connected, completes a circuit from the coin control conductor 35 to the grounded mid-tap from the primary winding of the transformer 15. The operating coil for the relay 54 is connected to the opposite vertices of the rectifier bridge circuit.

In case of failure of one of the brushes 12 and 13 connected to the slip ring 11 on the main motor generator set, an increased voltage is impressed on the rectifier 53 which is sufficient to effect operation of the relay 54. Relay 54, upon operation, impresses a negative bias on the grid of a three-element tube 56 from a battery 57. The three-element tube 56 controls the operation of a relay 58. the operating coil for the relay 58 being connected in series with the space discharge device 56. The relay 58 is normally operated and when an increased negative bias is impressed upon the grid of the space discharge device 56, the current flow through the relay 58 is reduced to effect release of the relay. The release of the relay 58 effects operation of the relay 49 to stop operation of the main motor generator set 1. The stopping of the operation of the main motor generator set starts the operation of the auxiliary motor generator set and transfers the load circuits from the main motor generator set to the auxiliary motor generator set in the manner above set forth. The space discharge devices 46 and 56 are supplied with plate potential from the ringing circuit 18 and the filaments are heated by current supplied from the ringing circuit 18. Condenser 61 is provided for smoothing out the ripples in the current supplied to the relay 47. The filaments of the space discharge devices 30 and 46 are preferably composed of tungsten coated with barium in order to provide a thermal inertia in the heating of the filaments as described in the patent to J. H. Sole, No. 1,998,104, dated April 16, 1935. If the load circuits are connected to the auxiliary motor generator set and one of the slip ring brushes of the auxiliary generator fails, the relay 49 completes a circuit for operating the alarm 52. A condenser 63 shunted by a resistance 62 is provided in the grid circuit of the tube 56 and a condenser 60 is provided in shunt to the coil of the relay 58 for delaying the operation of the relay to prevent operation thereof by sudden voltage changes.

Modifications in the control circuits and in the arrangement and location of parts may be made within the spirit and scope of the invention, and such modifications are intended to be covered by the appended claims.

What is claimed is:

1. In combination, two motor generator sets, a load circuit, and means operated when the load circuit is connected to one of said sets and the generator voltage of this set falls below a predetermined lower limit for starting the other motor generator set, for disconnecting the load circuit from the first motor generator set and for connecting the load circuit to the other motor generator set.

2. In combination, two motor generator sets, a load circuit, a transfer switch for connecting the load circuit to either one of said motor generator sets, and means operated when the load circuit is connected to one of said motor generator sets and the load circuit voltage is lowered below a predetermined limit for starting the other motor generator set and for operating said transfer switch to disconnect the load circuit from the first motor generator set and to connect the load circuit to the other motor generator set when the other motor generator set is in normal operation.

3. In combination, two motor generator sets, a load circuit, a transfer switch for connecting the load circuit to either one of said motor generator sets, means comprising a space discharge device and a low voltage relay controlled thereby for starting another motor generator set when the generator voltage of a motor generator set in operation falls below a predetermined level, and means governed by said low voltage relay for operating said switch to connect the load circuit to the other motor generator set when the speed of the motor on the second set is raised to a predetermined level.

4. In combination, a motor generator set having an alternating current motor adapted to be connected to an alternating current supply circuit and a generator provided with a commutator and slip rings, a motor generator set having a direct current motor adapted to be connected to a direct current supply circuit and a generator provided with a commutator and slip rings, an alternating current ringing circuit, a direct current coin control circuit, a transfer relay for connecting the ringing circuit and the coin control circuit to the generator of the first mentioned motor generator set and to the generator of the second mentioned motor generator set, and means when the first mentioned motor generator set is connected to the ringing and the coin control circuits and low voltage is supplied to the ringing circuit for starting the operation of the second mentioned motor generator set and for operating said transfer relay to connect the ringing and coin control circuits to the second mentioned motor generator set upon building up of a predetermined counter electromotive force by the motor of the second mentioned motor generator set.

5. In combination, two motor generator sets, a load circuit, a transfer switch for connecting the load circuit to either one of said motor generator sets, an alarm, and means operated when the load circuit is connected to one of said motor generator sets and the load circuit voltage is raised above a predetermined limit for stopping this motor generator set and operated when the load circuit is connected to the other motor generator set and the load circuit voltage is raised above a predetermined limit for operating said alarm.

6. In combination, two motor generator sets, a load circuit, a transfer switch for connecting the load circuit to either one of said motor generator sets, an alarm, means for stopping a first one of said motor generator sets when the load circuit is connected to this motor generator set and the load circuit voltage is raised above a predetermined limit and for operating said alarm when the load circuit is connected to the second motor generator set and the load circuit voltage is raised above the predetermined limit, and means for starting the second motor generator set when the load circuit is connected to the first motor generator set and the load circuit voltage falls below a predetermined lower limit and for operating said transfer switch to connect the load circuit to the second motor generator set when the second motor generator set is in normal operation.

7. In combination, two motor generator sets, a load circuit, a transfer switch for connecting the load circuit to either one of said motor generator sets, means operated when the load circuit is connected to one of said motor generator sets and the load circuit voltage is raised above a predetermined limit for stopping this motor generator set, and means operated upon reduction of the voltage on the load circuit when stopping the motor generator set connected to the load circuit for starting the other motor generator set and for connecting the load circuit to the other motor generator set when the other motor generator set is operating at normal speed.

8. In combination, a main motor generator set adapted to be connected to an alternating current supply circuit, an auxiliary motor generator set adapted to be connected to a direct current supply circuit, a load circuit, a transfer switch for connecting the load circuit to either one of said motor generator sets, means operated when the load circuit is connected to the main motor generator set in operation and the load circuit voltage is raised above a predetermined limit for stopping this motor generator set, and means operated upon a predetermined reduction in the generator voltage of the main motor generator set when stopping this set for starting the auxiliary motor generator set and for connecting the load circuit to the auxiliary motor generator set when the auxiliary motor generator set is operating at normal speed.

9. In combination, a main motor generator set having a double current generator, an auxiliary motor generator set having a double current generator, a direct current load circuit, an alternating current load circuit, a transfer relay for connecting said load circuits to either of said generators, and means operative upon failure of a slip ring brush when the load circuits are connected to the main set for stopping the main set, for operating the auxiliary set and for operating the transfer relay to transfer the load circuits to the auxiliary set.

10. In combination, a main motor generator set having a double current generator, an auxiliary motor generator set having a double current generator, a direct current load circuit, an alternating current load circuit, a transfer relay for connecting said load circuits to either of said generators, an alarm, means for stopping the main set when the load circuits are connected to the main set and one of the slip ring brushes fails and for operating said alarm when the load circuits are connected to the auxiliary set and one of the slip ring brushes fails, and means for operating said auxiliary set and for connecting the load circuits to the auxiliary set when the load circuits are connected to the main set and the main set is stopped.

11. In combination, a main motor generator set having an alternating current motor adapted to be connected to an alternating current supply circuit and a generator provided with a commutator and slip rings, an auxiliary motor generator set having a motor adapted to be connected to a direct current supply circuit and having a generator provided with a commutator and slip rings, a direct current load circuit, an alternating current load circuit, a transfer relay for connecting the two load circuits to either of said generators, a rectifier connected between the direct current load circuit and the slip rings of an operated generator for rectifying the alternating current ripple on the direct current load circuit, means controlled by said rectifier in case of failure of one of the generator slip ring brushes when the load circuits are connected to the main set for stopping the operation of the main motor generator set, means operated upon a predetermined reduction in the generator voltage of the main motor generator set for starting the auxiliary motor generator set, and means for operating said transfer switch when the auxiliary set is operating at normal speed to connect the load circuits to the auxiliary motor generator set.

12. In combination, a main motor generator set having a generator provided with a commutator and slip rings, an auxiliary motor generator set having a generator provided with a commutator and slip rings, a direct current load circuit, an alternating current load circuit, a transfer relay for connecting said load circuits to either of said generators, a rectifier connected between the direct current load circuit and the slip rings of an operated generator for rectifying the alternating current ripple on the direct current load circuit, an alarm, and means controlled by said rectifier for stopping the main motor generator set when the load circuits are connected to the main set and one of the slip ring brushes fails and for operating said alarm when the load circuits are connected to the auxiliary set and one of the slip ring brushes fails.

13. In combination, two motor generator sets, a load circuit, a transfer switch for connecting the load circuit to either one of said motor generator sets, and means operated when the load circuit is connected to one of said motor generator sets and the load circuit voltage varies beyond a predetermined limit for starting the other motor generator set and for operating said transfer switch to disconnect the load circuit from the first motor generator set and to connect the load circuit to the other motor generator set.

JAMES M. DUGUID.
JOHN H. SOLE.